United States Patent [19]

Hampshire et al.

[11] 4,355,385

[45] Oct. 19, 1982

[54] MULTIPLEX INFORMATION HANDLING SYSTEM

[75] Inventors: Michael J. Hampshire, Liversedge; Jonathan H. Williamson, Clifton, both of England

[73] Assignee: Ward & Goldstone Limited, Salford, England

[21] Appl. No.: 116,997

[22] Filed: Jan. 30, 1980

[30] Foreign Application Priority Data

Feb. 1, 1979 [GB] United Kingdom ............... 7903489
Jul. 6, 1979 [GB] United Kingdom ............... 7923618

[51] Int. Cl.$^3$ .......................... H04J 3/02; H04B 3/02
[52] U.S. Cl. ................................... 370/85; 340/825.5
[58] Field of Search ............ 370/85, 95, 92, 89; 340/147 CV, 147 CN, 147 LP, 825.5, 825.51

[56] References Cited

U.S. PATENT DOCUMENTS

| | | | |
|---|---|---|---|
| 3,796,992 | 3/1974 | Nakamura et al. | 370/85 |
| 3,814,861 | 6/1974 | Robbins | 370/85 |
| 3,818,447 | 6/1974 | Craft | 370/85 |
| 4,058,681 | 11/1977 | Imaizumi et al. | 370/85 |
| 4,156,151 | 5/1979 | Borroni | 340/147 CV |
| 4,199,663 | 4/1980 | Herzog | 370/85 |

OTHER PUBLICATIONS

"Time-Shared Multiplexing System Applied to Motor Vehicles", by Nevett, Society of Automotive Engineers, Automotive Engineering Congress and Exposition, Detroit, Mich., Feb. 23-27, 1976.

*Primary Examiner*—Douglas W. Olms
*Attorney, Agent, or Firm*—Fleit & Jacobson

[57] ABSTRACT

A multiplex information handling system for a vehicle has a number of transmitters and receivers all interconnected by a common power bus and signal bus. The transmitters transmit signals along the signal bus representing the operational state of control equipment or equipment controlled by that equipment and the receivers respond to and act on such signals to, for example, authorize the display of information received or the initiation of a control function. System management and supervision is provided, such that, where the transmission of certain signal states is made dependent upon the state of other signals in the system, this dependence can be overridden, for example, for vehicle servicing. Supervision also provides for certain urgent signals to be given priority over other signals.

10 Claims, 6 Drawing Figures

MULTIPLEX INFORMATION HANDLING SYSTEM

This invention relates to multiplex information handling systems.

In such a multiplex information system various management and/or supervisory tasks may need to be performed.

Management tasks may be defined as the enabling or inhibition, for transmission, of certain signal states where such enabling or inhibition is dependent on the state or states of other signals inputed to or held in memory in the system. For example, in an automobile with an automatic gearbox it may be required that "Drive" is only permitted to be activated when the driver's seatbelt is on.

Supervisory tasks may be defined as those which override the normal operation of the system. In this case a signal, which under certain circumstances may be deemed illegal, may have already been received by the receiver output for which it was intended. The supervisory task would then be to transmit the rectifying signal to the same receiver output in a time which is less than would permit the signal to propagate further than the output. In some cases this latter constraint might require the introduction of an artificial time constant at the receiver output although in reality many equipments which might be controlled by such a multiplex information system have an associated response time or time constant which is greater than the time taken to send and receive a remedial signal. An example of a supervisory task might be found in the same automobile described above, but in a garage or on the production line where a seatbelt override may be required to save time. Alternatively, it may simply be advantageous for certain information to be given priority over other information in order that an urgent signal, say for switching on the brake lights in an automobile, may be transmitted, received and acted upon as quickly as possible.

According to the present invention, there is provided a multiplex information system comprising a plurality of transmitters and a plurality of receivers all interconnected by a signal bus and by a power bus, pieces of control equipment associated with the transmitters and receivers, and responsive to signals received by an associated receiver along the signal bus, and signal priority establishing means, the transmitters being operative to transmit signals along the signal bus representative of the operational state of associated control equipment and/or pieces of equipment controlled by the control equipment under the control of the signal priority establishing means.

Transmitters may incorporate means to protect analogue data from variation due to variation in the power supply, and more particularly this may be achieved by the use of a constant current source.

The invention also comprises a vehicle incorporating a multiplex information system defined above. The pieces of equipment controlled by the control equipment of the system are the operational equipment of the vehicle such as lights.

In order that the invention may be more clearly understood several embodiments of the multiplex information handling system will now be described with reference to the accompanying drawings, in which.

The timings allow ±9% tolerance on the nominal oscillator speed.

The multiplex information handling system is of the same general type described in United Kingdom copending patent application No. 9493/78 corresponding to U.S. Pat. Ser. No. 17,096 filed on Mar. 5, 1979. A plurality of local processing units are joined by a signal bus SB and a power bus. Each unit comprises a transmitter and a receiver, has a plurality of inputs and a plurality of outputs, and is contained in a suitable housing.

Figure 1:
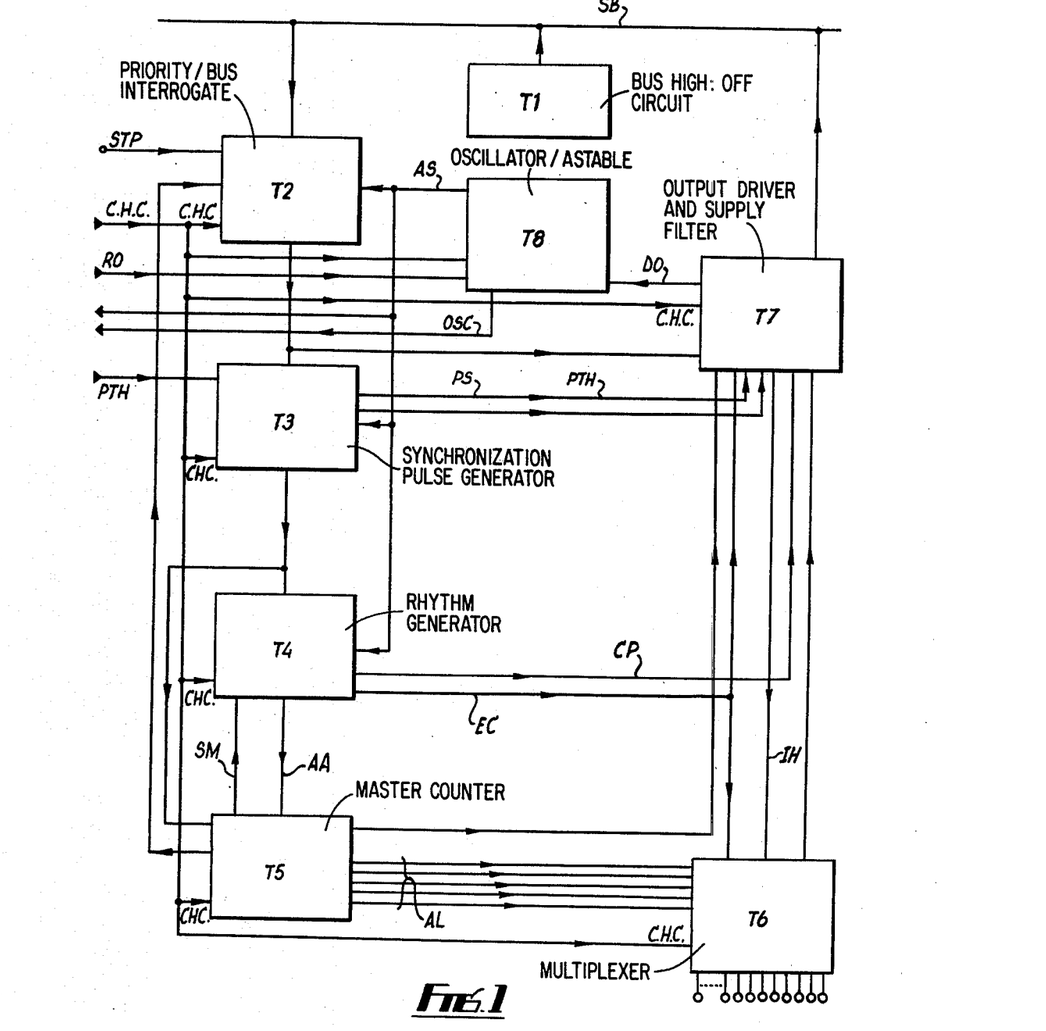
FIG. 1 represents a block diagram of a transmitter of the information handling system.

Referring to FIG. 1, the transmitter comprises a bus high:off circuit T1, a priority/bus interrogate T2, synchronisation pulse generator T3, rhythm generator T4, master counter T5, multiplexer T6, output driver and supply filter T7, and oscillator/astabe T8 having oscillator and astable outputs referenced OSC and AS respectively and reset oscillator input referenced R0. The receiver (FIG. 2) comprises a continuous high:clear circuit R1, pulse discriminator R2, sample pulse generator R3, sample pulse counter/gate pulse generator R4, shift register R5, comparator R6, latch R7, demultiplexter R8, gate pulse counter/switch pulse generator R9, comparator R10, output stage R11 and a delay circuit R12.

Figure 4:
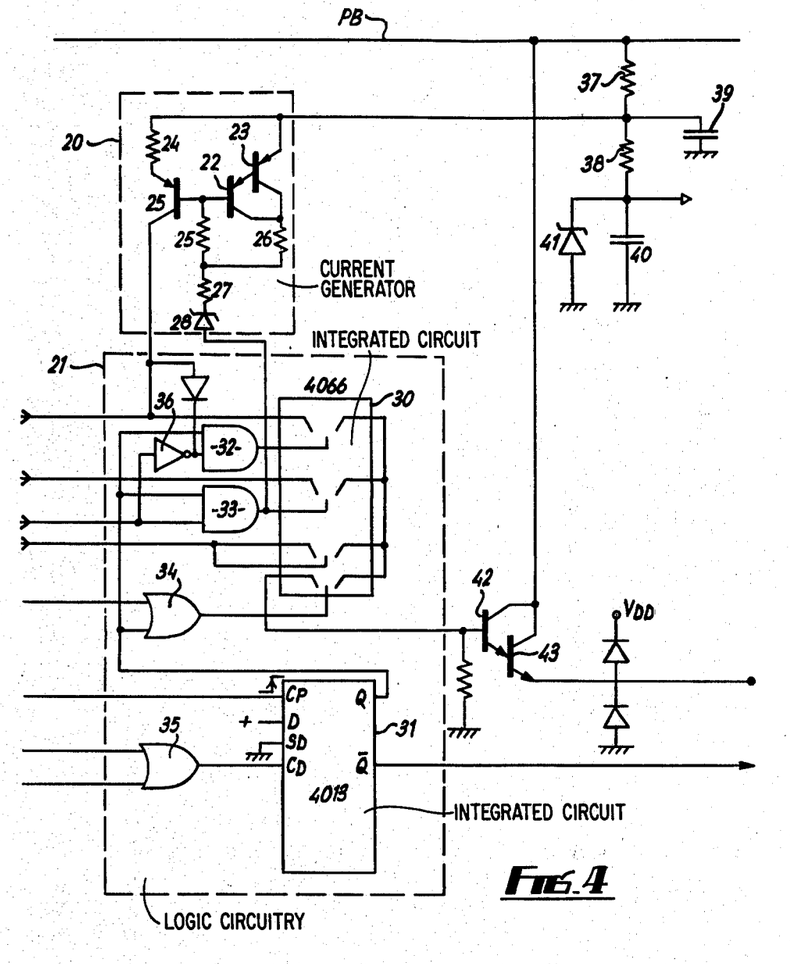

Referring to FIG. 4, the output driver stage and supply filter T7 of the transmitter comprises a current generator 20 and logic circuitry 21. The current generator comprises two PNP transistors 22 and 23 connected in cascade and a further PNP transistor 24a connected with associated resistors 24, 25, 26 and 27 and zener diode 28. The logic circuitry 21 comprises two integrated circuits 30 and 31. The pins of logic circuits 30 and 31 are fed through a selection of logic gates comprising two AND gates 32 and 33, two OR gates 34 and 35 and a NOT gate 36. The current generator is fed from the power bus PB through a supply filter comprising two resistors 37 and 38, two capacitors 39 and 40 and a zener diode 41. The output from the circuit is through two cascaded PNP transistors 42 and 43 to the signal bus SB.

The signals emanating from and applied to the various times will be dealt with in the description of the operation of multiplex information system which now follows. The system operates with a transmission format based on a unit time period T. $T=1/2F$ where F is the highest fundamental frequency chosen to be transmitted, or in the limit where T is the minimum descernible duration of a pulse. In this particular embodiment two signal modes are employed. They are a clock pulse format followed by a data bit 2T in duration and (1) a data bit 3T in duration or (2) a data bit 5T in duration (for the analogue data bit). However depending on the chosen oscillator tolerance it may be more advantageous to follow a clock pulse format C by 3 data bits D or 5 or 1 etc. and their duration would be determined again by the oscillator tolerance. Hence we may derive the most efficient general format or mode for digital data bits but analogue bits must be longer and a different format or mode may prove the most efficient way of using bandwidth rather than attempting to constrain the analogue to digital speeds or impair bandwidth by running the digital in the same mode as the slow analogue. Additionally the number of modes will be determined by the word length i.e. the number of data bits required to completely identify the addressing of the analogue data bits. When the system is off, the signal bus is held high by bus high circuit T1 (FIG. 1). This is sensed by continuus high:clear circuit R1 (FIG. 2) which then clears all counters and flip flops on the receiver (FIG. 2) and its associated transmitter (FIG. 1) and disables the oscillator T8 line D0 (FIG. 1). The continuous high clear (C.H.C) signal is sent from circuit R1 (FIG. 2) to circuits R2, R3, R4, R5, R9, R11 of the receiver (FIG. 2) and circuits T2, T3, T4, T5, T6, T7, T8 (FIG. 1) of the transmitter.

When the system is switched ON, the priority input in the first instance is low giving rise to the following conditions in the transmitter (FIG. 1). The signal bus is released by circuit T1 (FIG. 1) and goes low since nothing acts upon it. Oscillators T8 free run. The rhythm generator T4 (FIG. 1) generates a clock pulse CP which goes to the output driver T7 and enables its connection to the final output driver which is inhibited. The enable clock/inhibit MPX's line is referenced EC in FIG. 1. The rhythm generator T4 then advances the address of the MPX's held in the master counter T5 (FIG. 1) at the times indicated in the timing diagram of FIG. 3 (I) (g) and (i) and resets itself. This completes the first rhythm in mode 1. A mode 1 rhythm (referenced 1 in FIG. 3) consists of a clock pulse and two address advances. In FIG. 1 the advance address line is referenced AA, the select mode line SM and the address lines themselves AL.

Figure 3:
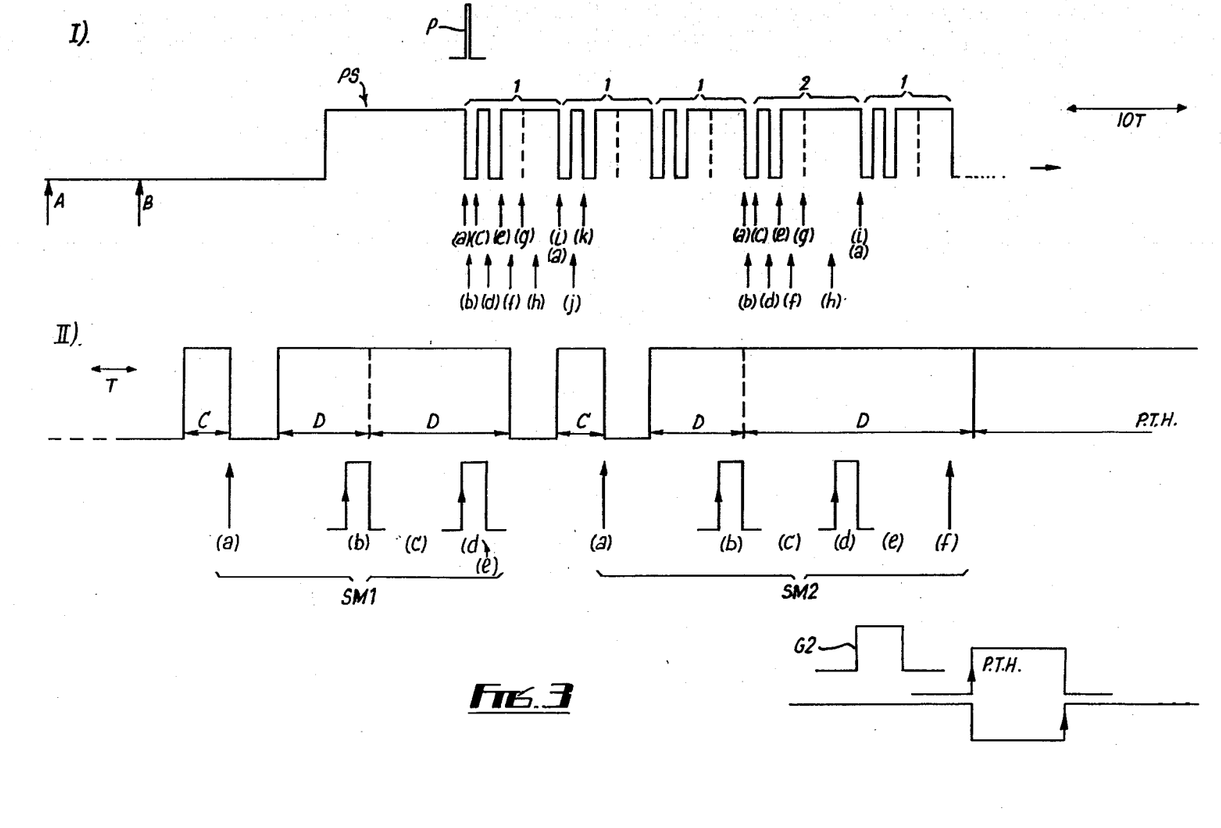
FIG. 3 shows the timings of signals passed between transmitters of the type in FIG. 1 and receivers of the type in FIG. 2 on operation of the system, FIG. 4 gives the details of output driver stage forming part of the transmitter of FIG. 1.

The rhythm generator T4 will normally run in mode 1 except in every fourth rhythm which is mode 2 (referenced 2 in FIG. 3) and is selected at the close of every third rhythm in mode 1 by the master counter T5. A mode 2 rhythm consists of a clock pulse, and two address advances in the same way as the mode 1 rhythm but the timings of the address advances vary in the second address advance of the rhythm. The mode 2 rhythm is also indicated in FIG. 3. The rhythm generator T4 continues to advance the master counter T5, with nothing transmitted, until the count reaches that equivalent to sixteen transmitters. At this point bus interrogate T2 (FIG. 1) is enabled (point A, FIG. 3I). However, this series of events, from system ON point, may be short circuited straight to a bus interrogation enabled (point B FIG. 3(I) by a rising edge on the "set priority" input STP of T2 (FIG. 1). On FIG. 3 an arrowheador a pulse edge indicates an active edge.

If no priority has been selected the system continues by timing the duration of the logic lows on the signal bus SB until a continuous low of 24 astable periods (where an astable period in this case is identically of duration T defined above) occurs. Since nothing has been transmitted yet, the transmitter wiht the fastest oscillator will immediately achieve the pre-transmission bus low condition. Similarly if priority has been selected, a bus low condition for a time period of 16T would immediately have been achieved by the transmitter with priority or, when more than one transmitter is simultaneously given priority, by the transmitter with the fastest oscillator.

When the successful precondition is achieved by T2 (FIG. 1) the output driver T7 is completely enabled and transmission commences with a synchronisation pulse of duration 12T ordered from synthronisation/PTH generator T3 (FIG. 1) by priority/bus interrogate T2 (FIG. 1). The signal bus SB therefore goes high and all other transmitters therefore become inhibited. Fronting a transmission a synchronisation pulse means that receivers which recognise that pulse will receive, and others which might be "tuned" to receive a different synchronisation pulse (twice as long for example) would ignore, the ensuing transmission. This is very valuable since it allows two or more essentially different systems to be operated on the same signal bus, providing the original constraints are adhered to. The immediate use which can be made of this is to send diagnostic information at a slower repeat transmission rate than normal (since it requires less security), fronted by a different synchronisation pulse (or sequence of pulses) in a single special diagnostic transmission.

Figure 2:
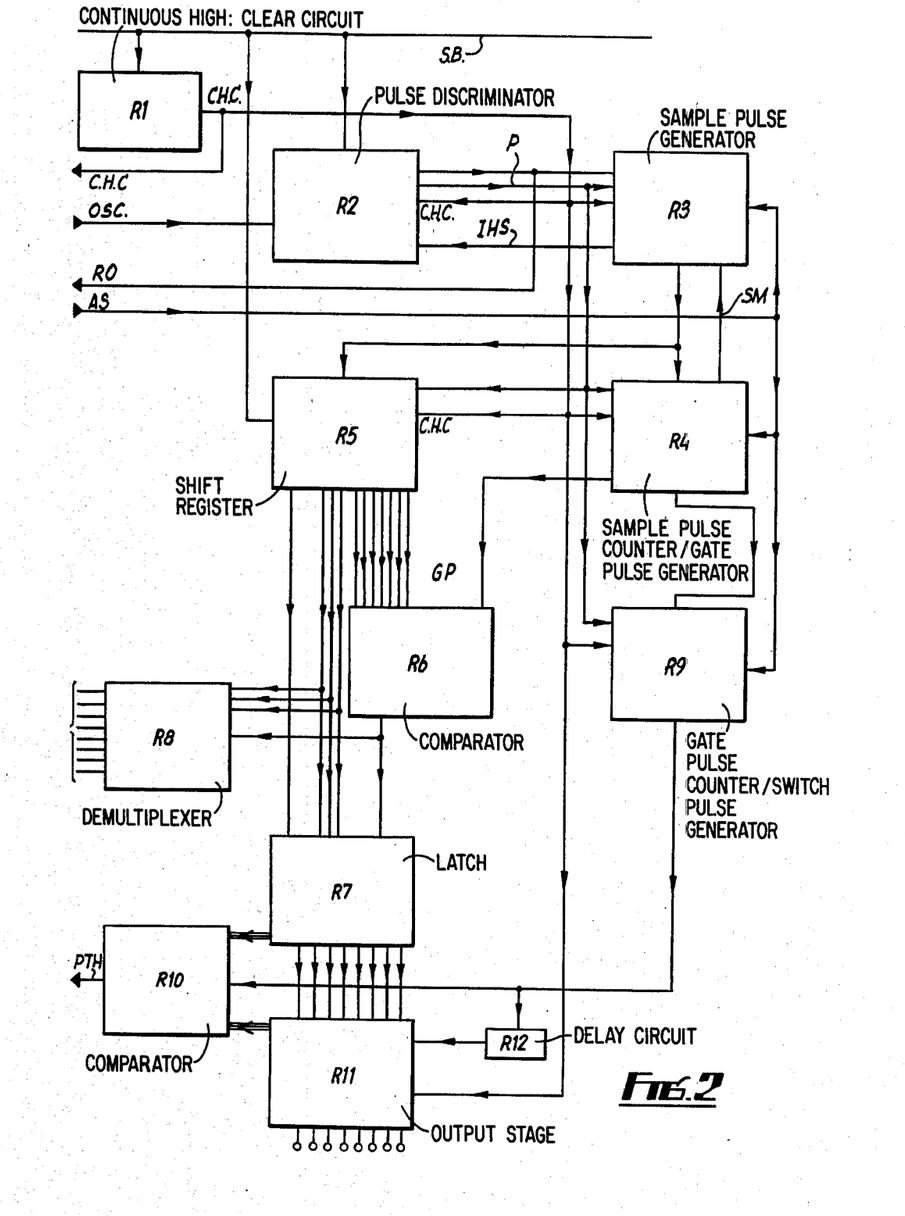
FIG. 2 represents a block diagram of a receiver of the information handling system.

Within the transmitter the synchronisation pulse from generator T3 resets the rhythm generator T4 ready for a transmission and resets the master counter T5 so that, providing priority is not activated, the transmitter will make a transmission and then allow sufficient time for the other fifteen transmitters to communicate before interrogating the signal bus SB again for another transmission. Whenever there is a logical low to high transition on the signal bus SB the pulse discriminator R2 (FIG. 2) commences timing the pulse duration. The pulse discriminator R2 will take no action until it has registered a synchronisation pulse of the correct type. If a pulse of duration anywhere between 10T and 32T is received it is accepted as being a synchronisation pulse in this incidence. Referring to FIG. 3, the falling edge of a sychronisation pulse PS gives rise to a short pulse P of the order of 1 µs duration in the receiver R2 (FIG. 2) which clears all counters in the receiver in circuits R3, R4, R5, R9 (FIG. 2). Having registered a synchronisation pulse PS the pulse discriminator R2 is then enabled to act upon received clock pulses.

When the synchronisation pulse PS falls the rhythm generator T4 and master counter T5 in the transmitter (FIG. 1) are once again enabled and the transmission continued with the first rhythm in mode 1. This consists of the following operations carried out by rhythm generator T4 (FIG. 1) and illustrated by FIG. 3(I).

(a) Enable output drive T7 (FIG. 1) to transmit clock pulse. Inhibit PMX'S T6 (FIG. 1) line IH.
(b) Count off time period 1T. Transmitting logic low. ⎫
(c) Give clock pulse of duration 1T consisting logic high. ⎬ CLOCK PULSE FORMAT
(d) Count off time period 1T transmitting logic low. ⎭
(e) Disable output driver from transmitting clock pulse. Enable MPX's T6 (FIG. 1) and enable output driver T7 (FIG. 1) to transmit multiplexed data bits.
(f) Count off time period 2T transmitting the input of the selected MPX channel.
(g) Advance the PMX address held in master counter T5 (FIG. 1).
(h) Count off time period 3T transmitting the input of the selected MPX channel.
(i) Advance the MPX address held in master counter T5 (FIG. 1). Reset the rhythm generator for -continued the next rhythm.

The transmission proceeds with the rhythm generator govering the transmission format giving all rhythms in mode 1 except every fourth rhythm which is in mode 2. The only difference in mode 2 in the listing above for mode 1 is in time (h) which becomes:

(h) Count off time period 5T transmitting the input of the selected MPX channel.

Having registered a synchronisation pulse the next pulse received by the pulse discriminator R2 (FIG. 2) will be a clock pulse (j) in the clock pulse format. On the falling edge (k) of the clock pulse the pulse discriminator R2 will:

(i) Reset the oscillator T8 so that its phase is zero with respect to the clock pulse falling edge (k) providing that the transmission being received does not originate from the receiver's associated transmitter, and (ii) Enable sample pulse generator R3 (FIG. 2).

The sample pulse generator R3 has as many modes as the rhytmn generator T4 (FIG. 1) in the transmitter. The order of the transmitted data is known by the receiver and the sample pulse counter R4 (FIG. 2) will select the correct sampling mode according to the cumulative amount of data received at the close of each sampling rhythm. Accordingly sampling mode SM1 is always selected (select mode input references SM in FIG. 2) when a clock pulse is received except at every fourth clock pulse when mode 2 is selected.

Sampling mode SM1 comprises the following actions:

(a) Clock pulse received. Oscillator reset. Inhibit pulsed discriminator R2 (line IHS FIG. 2) and count off time period 2½T.

(b) Generate a sample pulse of duration ½T.

(c) Count off time period 2T.

(d) Generate a sample pulse of duration ½T.

(e) Reset sample pulse generator, enable pulse discriminator to listen for another clock pulse and wait ready for next signal from pulse discriminator.

Sampling mode 2 is the same as mode 1 except item (e) becomes item (f) and item (e) is as follows:

(e) Count off time period 2T.

Whenever a sample pulse R3 is generated (see II FIG. 3) it is passed to the shift register R5 (FIG. 2) and its rising edge clocks the state of the signal bus (high or low) into the shift register R4. When eight bits of data have been clocked into the shift register R5 the sample pulse counter/gate pulse generator R4 gives a gate pulse EP ordering the comparator R6 to check (a) that the word is addressed to that receiver (b) that the parity check is correct (in this system there is no parity).

If both these conditions are fulfilled the latch R7 (FIG. 2) and the demultiplexer R8 whose appropriate outputs are addressed directly from the shift register R5 are immediately enabled. This results in the data bit being entered into the appropriate latch R7 output and the appropriate sample and hold amplifier receiving a logic pulse to command sampling.

Gate pulses (FIG. 2) are produced by the gate pulse generator R4 on the falling edge of every eighth sample pulse and are counted by the gate pulse counter/switch pulse genrator R9 which having counted eight gate pulses waits until the end of the final data bit, and then instructs the comparator R10 to look for an imminent change of state in any of the outputs. Additionally it commands the new data in the latch R7 to be registered at the outputs but this instruction is delayed to permit the comparator R10 to compare the latch R7 and output stage R11 and act if necessary. R12 provides the relay.

When the rhythm generator T4 (FIG. 1) in the transmitter concludes the final rhythm of a transmission the final advance of addresss in the master counter T5 causes this to disable the output driver T2 from further transmission until the master counter has counted off enough time for fifteen other transmitters to communicate, whereupon it will once again enable a bus interrogation and events continue as from the enabling of bus interrogate T2 described above.

However, when the receiver comparator R10 (FIG. 2) receives the instruction to compare output R11 and latch R7 if a change of state is imminent in the outputs the comparator R10 commands a Post Transmission high (P.T.H.). This command arrives at the transmitter sync./P.T.H. generator T3 (FIG. 1) and causes the signal bus SB to go high for a period of 128T. This function is independent of any other transmission and overrides the disable output driver command for its duration only. Due to the delay T12 (FIG. 2) in the output switching command, in the receiver, when a change of stage of any output is about to occur the post transmsision high will have already been activated a period of 2T before the switching command is received by the output stage R11. In this way all data transmission is inhibited for a period of 128T, only when loads are being switched and the environment is particularly noisy. When the P.T.H. is over, transmissions will continue in the normal fashion and any transmitters enabled by priority or master counter to interrogate the bus should then find the bus low again and proceed as from the enabling of the bus interrogate T2 described above.

By the use of priority a transmitter may transmit directly at the close of a current data transmission and-/or post transmission high.

At any time the signal bus SB may be forced high continuously by T1 (FIG. 1) which, holding it there for more than 0.5 seconds will cause all transmitters and receivers to shut down as described above for the system OFF condition.

Thus, when the above described arrangement a single transmission of a message is allowed for at any time depending on its priority. The relevant transmitter may then, if required, return from that point in time to its normal regime. This avoids the delay of urgent messages which would otherwise take place due to the transmitter of the message being inhibited by other transmitters.

The width of the clock pulse is short and therefore not wasteful of bandwidth and since the transmsision is principally vulnerable to noise spikes during the clock pulse format the ratio of clock pulse format time to data time having decreased provides an improvement in the noise immunity of the system.

In addition to the tolerance of the timing devices, timings initiated by an event on the signal bus now have improved accuracy since the variance introduced by the disparity between the event and the next active edge of the timing waveform is eliminated.

In previous arrangements, a lengthy signal bus low pre-condition preceded each transmission. The purpose of this lengthy precondition was to inhibit data transmission whilst the environment was still noisy from switching loads, but compared to the frequency of transmissions switching occured only rarely making this lengthy pre-condition largely redundant. The present invention now allows for more efficient use of the bandwidth by temporarily inhibiting transmissions only when switching occurs.

Analogue data is protected against considerable supply variations.

Data bits are now no longer than they need be and come in the most efficient multiples for a particular tolerance. Radio interference is reduced by eliminating gaps between adjacent data bits, and by limiting the highest fundamental.

Figure 5:
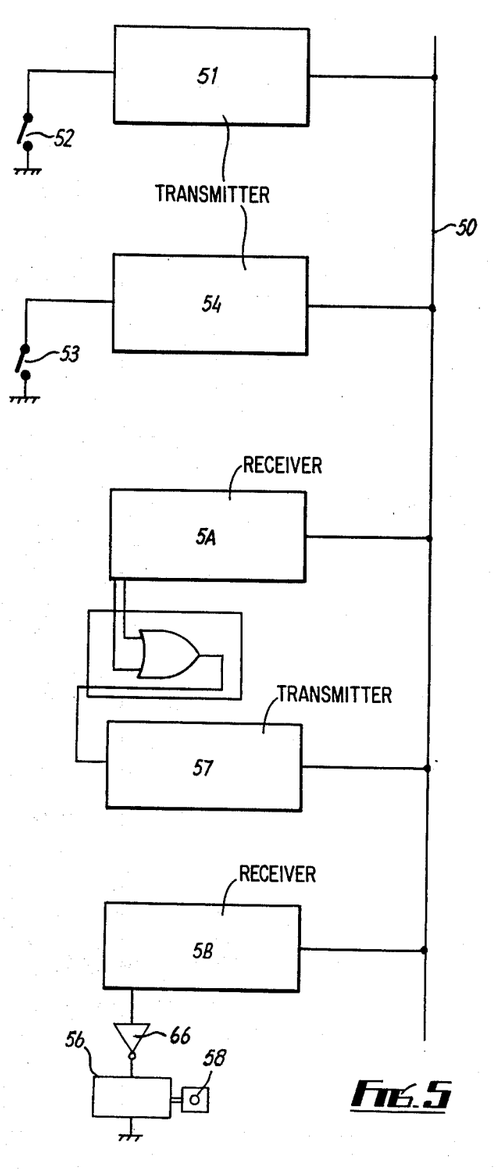
FIG. 5 is a block diagram of part of a multiplex information handling system illustrating means for performing a management task.

Referring to FIG. 5 which is a block diagram representing part of a multiplex information handling system as it might be organised in an automobile. Transmitters and receivers are connected via a common signal bus 50. Transmitters transmit 20 times/sec. A LOW or grounded input represents an ON signal. A HIGH or floating input represents an OFF signal. The principal task is to select drive (referenced 58) on an automatic vehicle. When the seatbelt is off this information is present on the signal bus as it is included in the transmission of Transmitter 54, 20 times/sec. A receiver 5A is designated to respond to the seatbelt condition and the select drive switch 52 (whose status appears in the transmission of transmitter 1, 20 times/sec.). For as long as the seatbelt switch 53 is open output 6 of this receiver 5A will be high and therefore with this very simple management logic transmitter 57 will always transmit a logic HIGH or OFF signal from its number 2 input. The receiver 5B which responds to transmitter 57 input 2 will therefore always hold the gearbox solenoid switched off. However as soon as the seatbelt switch 53 is closed then receiver 5A output 6 will go LOW and input 2 of transmitter 57 will follow input 1 of transmitter 51 and therefore so will output 3 of receiver 5B which controls the gearbox solenoid 56.

Figure 6:
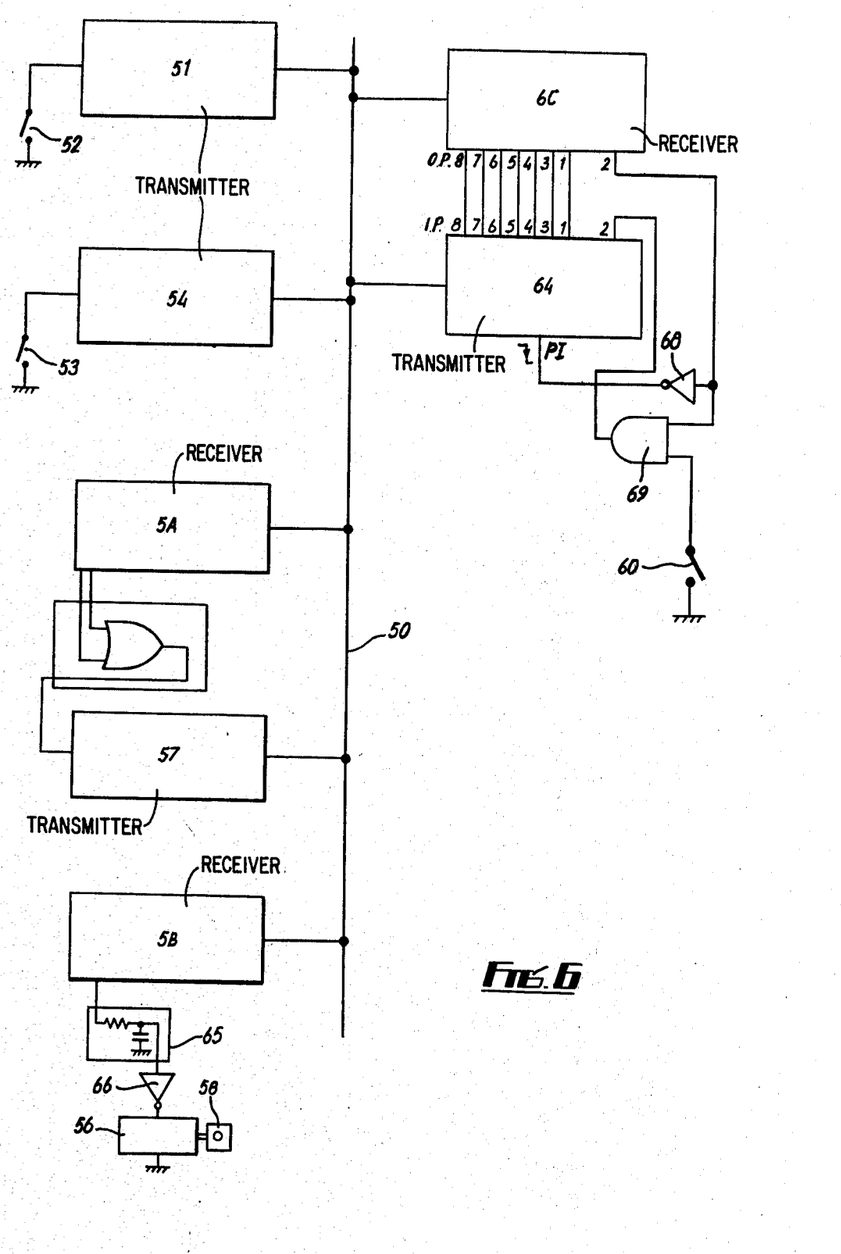
FIG. 6 is a block diagram of part of a multiplex information handling system illustrating means for performing a supervisory task.

Referring to FIG. 6, a block diagram of the multiplex information handling system is shown for the same vehicle which may now be in a garage for servicing. The mechanic may attach to the signal bus 50 a number of supervisory units. In this case only one is connected and permits him to select drive without having to put on the safety belt each time. The supervisory unit comprises a receiver 6C and duplicate transmitter 65, connected to the receiver through inputs 1 and 3 to 8 of the transmitter and outputs 1 and 3 to 8 of the transmitter. Output 2 of the receiver is connected through an inverting buffer 68 to the priority input PI of the receiver and input 2 of the transmitter is connected to the output of an AND gate 69. This gate 69 has two inputs one connected to the output 2 of receiver 6C and the other connected through a seatbelt override switch 60 to earth. With the override seatbelt switch 60 open the duplicate transmitter 64 will transmit a duplicate message to transmitter 54. When the override seatbelt switch 60 is closed the duplicate transmitter 64 will transmit duplicate transmission except on input 2 which will always transmit a LOW or ON signal. Each time the original transmitter 54 transmits a HIGH or OFF signal this will be received by receiver 6C and cause an immediate priority transmission of the duplicate transmitter 64 sending the remedial ON message. It may be necessary to incorporate a resistive capacitive Time Constant circuit 65 at output 3 of receiver 5B (or output 6 of receiver 5A) to ensure that the drive is not deselected before the remedial priority transmission can be transmitted and received, but in reality the response of most control equipment is very much slower than the time taken for this remedial transmission which can be better than 300 $\mu s$, which may represent a typical time to activate and receive a priority signal. This time constant circuit 65 is connected to the gearbox solenoid through an inverting buffer 66.

What is claimed is:

1. A multiplex information handling system comprising:
   a plurality of transmitters and a plurality of receivers, all interconneted by a signal bus and by a power bus;
   pieces of control equipment associated with the transmitters and receivers, and responsive to signals received by an associated receiver along the signal bus; and
   signal priority establishing means for establishing a priority among the signals transmitted over and received from the signal bus;
   wherein the transmitters transmit said signals along the signal bus, said signals being representative of the operational state of at least one of associated control equipment and pieces of equipment controlled by the control equipment, each said transmitter normally being operative to transmit periodically and after detecting a first predetermined time period of quiet conditions on the signal bus, and at least one of the transmitters being additionaly operative in a priority mode under control of the signal priority establishing means to transmit after detecting quiet conditions on the signal bus for a second predetermined time period less than the first predetermined time period.

2. A multiplex information handling system as claimed in claim 1, further comprising generating means for generating signals dependent on the state of signals received by receivers from the signal bus.

3. A multiplex information handling system as claimed in claim 2, further comprising a control apparatus monitored by one said plurality of receivers, and a further apparatus responsive to the control apparatus, and wherein the generating means comprises a logic transmitter for transmitting a signal dependent upon the operation state of said control apparatus, and further comprising a further receiver responsive to the signal transmitted by the logic transmitter for holding said further apparatus in a predetermined state.

4. A multiplex information handling system as claimed in claim 3, wherein the control apparatus comprises an automobile seatbelt switch and the further apparatus comprises a select drive selector of an automobile transmission.

5. A multiplex information handling system as claimed in claim 4, further comprising a supervisory unit including a supervisory unit receiver, a duplicate transmitter and control means for controlling the transmitter to transmit a signal operative to override any signal transmitted by the logic transmitter.

6. A multiplex information handling system as claimed in claim 5, wherein the control means comprises a seatbelt override switch.

7. A multiplex information handling system as claimed in claim 1, further comprising delay means for delaying implementation of a received signal for longer than a time period required for a priority transmission and reception of a remedial signal.

8. A multiplex information handling system as claimed in claim 1, wherein said signals transmitted and received over said signal bus comprise analogue data, and wherein each of said plurality of transmitters includes protection means for protecting said analogue data from variation due to variation in power supplied over said power bus.

9. A multiplex information handling system as claimed in claim 8, wherein the protection means comprises a constant current source.

10. A vehicle incorporating a multiplex information handling system, said system comprising:
   a plurality of transmitters and a plurality of receivers, all interconnected by a signal bus and by a power bus;
   pieces of vehicle control equipment associated with the transmitters and receivers, and responsive to signals received by an associated receiver along the signal bus; and
   signal priority establishing means for establishing a priority among the signals transmitted over and received from the signal bus;
   wherein the transmitters trasmit said signals along the signal bus, said signals being representative of the operational state of at least one of associated vehicle control equipment and pieces of vehicle equipment controlled by the vehicle control equipment, each said transmitter normally being operative to transmit periodically and after detecting a first predetermined time period of quiet conditions on the signal bus, and at least one of the transmitters being additionally operative, in an priority mode under control of the signal priority establishing means, to transmit after detecting quiet conditions on the signal bus for a second predetermined time period less than the first predetermined time period.

* * * * *